DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 3, 1972

903 O.G. 4

T903,001

TERPOLYMER COMPOSITIONS

Oliver deS. Deex, Clayton, and William F. Fallwell, Jr., St. Louis, Mo., assignors to Monsanto Company, St. Louis, Mo.

Original application May 29, 1968, Ser. No. 732,887, now Patent No. 3,637,566, dated Jan. 25, 1972. Divided and this application June 19, 1970, Ser. No. 59,803

Int. Cl. D21h *1/28*

U.S. Cl. 117—155 UA

No Drawing. 14 Pages Specification

This invention relates to terpolymers containing (a) 2 to 60 weight percent of an olefinic unsaturated hydrocarbon compound, (b) 40 to 98 weight percent of a vinyl type compound having the formula $$CH_2{=}\overset{\overset{R_1}{|}}{C}{-}R_2$$

wherein $R_1$ is hydrogen, methyl or halogen and $R_2$ is hydrogen or a carbonyl type residue such as —$COOR_3$ or —$OCOR_4$ where $R_3$ is an alkyl radical having 1 to 12 carbon atoms, and $R_4$ is an alkyl radical having 1 to 4 carbon atoms, —CN, phenyl —Cl and —Br, and (c) 0.1 to 40 weight percent of a partial ester of (1) an $\alpha$-$\beta$-olefinic unsaturated polycarboxylic acid or anhydride thereof having from 4 to 10 carbon atoms and (2) a hydroxyl nonionic dispersing agent having the formula $$H{-}\left(OCH_2CH_2\right)_n{-}OR_9$$

wherein $R_9$ is any hydrophobic group having 6 to 30 carbon atoms or more in the hydrophobic group and $n$ is an average number of from about 0 to about 60. These compositions are useful as adhesives, extrusion coatings or gasketing material. In latex form, they are especially useful as adhesive binders in mineral pigment coating compositions for paper, paperboard and paper products. A specific example is a terpolymer of (a) ethylene, (b) vinyl chloride, and (c) ethoxylated tridecyl maleate half ester containing 9 to 10 ethoxy groups in the ester. They may also be applied as the only paper treating agent to improve the barrier properties and grease resistance of the paper or paperboard.